United States Patent Office 2,781,859
Patented Feb. 19, 1957

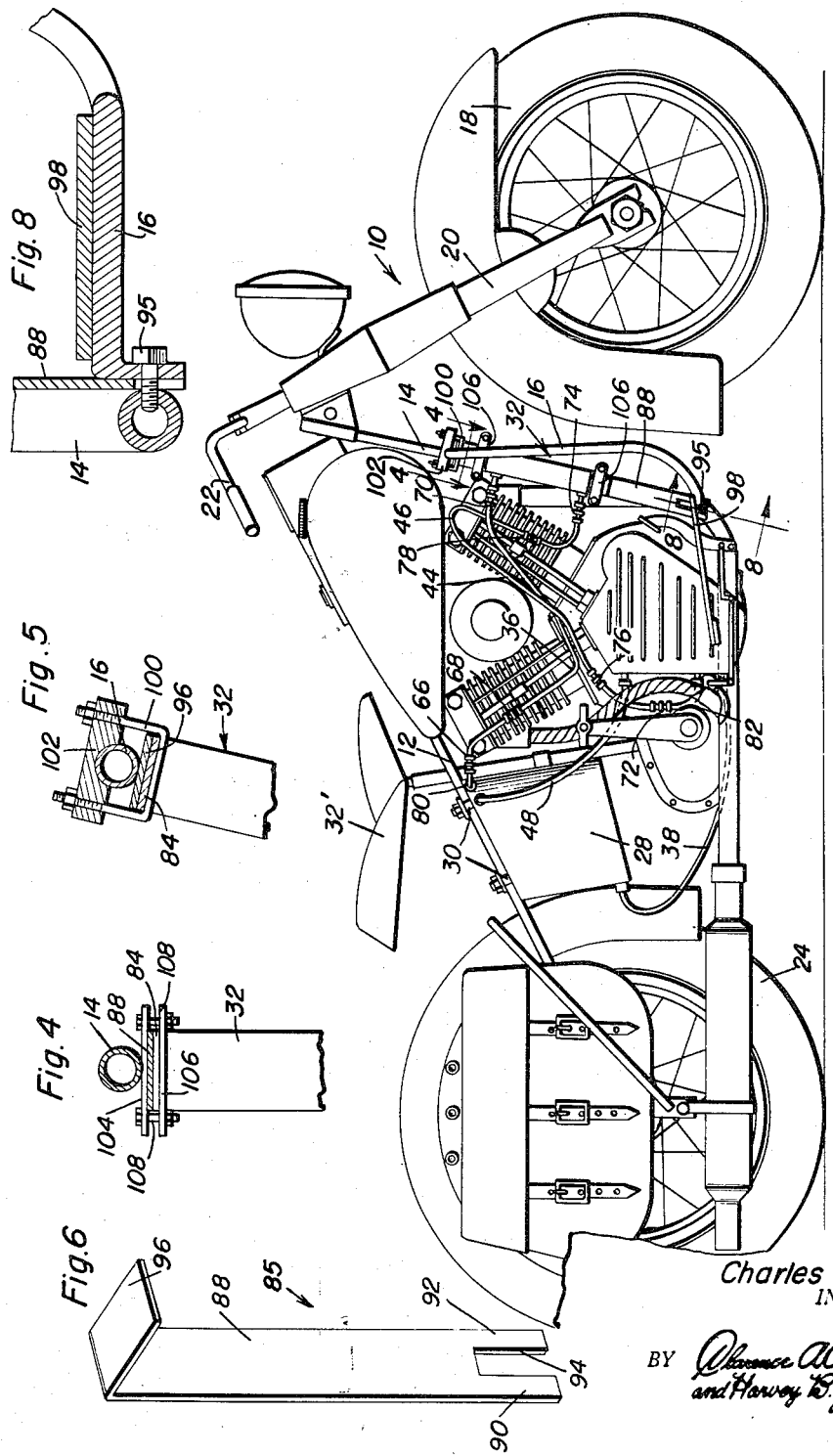

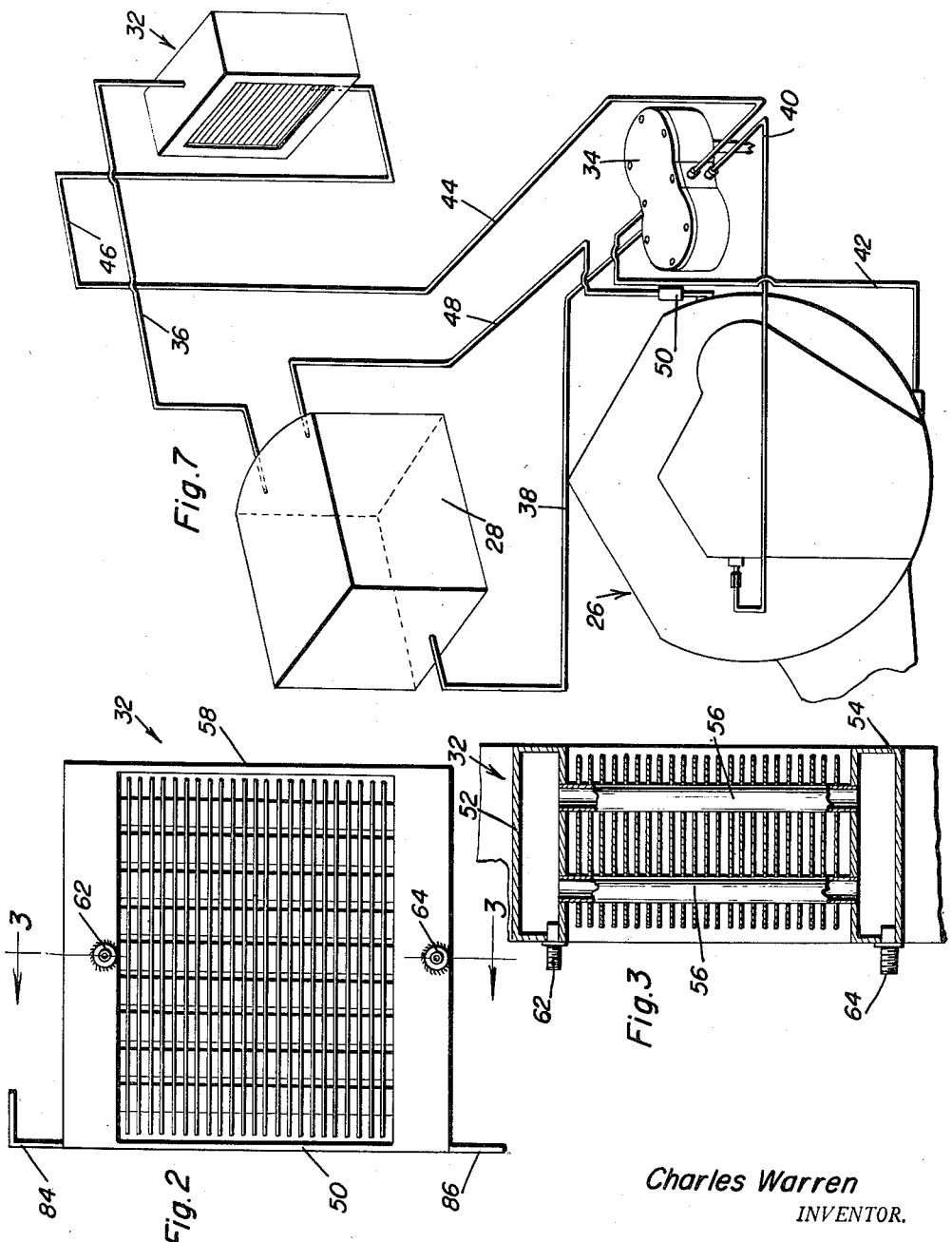

2,781,859

OIL RADIATOR FOR MOTORCYCLES

Charles Warren, Detroit, Mich., assignor of forty percent to James H. Davis, Bradenton, Fla.

Application October 15, 1954, Serial No. 462,597

7 Claims. (Cl. 180—33)

This invention relates generally to motorcycles and has for its primary object the provision of a supplemental oil system for motorcycle engines which will assure a constant supply of oil within a safe operating range of temperature even under the most adverse conditions.

Another object of this invention is to provide a supplemental oil supply system for motorcycle engines which includes an oil radiator for cooling the oil and a reservoir connected therewith, the dimensions of the reservoir being such as to materially increase the capacity over that of the normal oil system for the engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a motorcycle equipped with the supplemental oil supply assembly;

Figure 2 is an elevational view of the oil radiator;

Figure 3 is a vertical transverse section taken substantially along the plane of section line 3—3 in Figure 2;

Figure 4 is an enlarged horizontal section taken along the plane of section line 4—4 in Figure 1;

Figure 5 is an enlarged sectional view showing the manner of mounting the support bracket to the crash bar;

Figure 6 is a perspective view of the support bracket; and

Figure 7 is a diagrammatic view of the system as connected to a motorcycle engine.

Figure 8 is an enlarged sectional view taken on the line 8—8 of Figure 1.

Referring now more particularly to the drawings, reference numeral 10 indicates a motorcycle generally which includes the usual upper longitudinal frame member 12, the front vertical frame member 14, and the crash bar structure 16 connected to the front member and projecting laterally from opposite sides thereof. The front wheel 18 is carried at the lower end of the fork 20 provided at its upper end with the handle bars 22. The rear wheel 24 is carried at the rear end of the frame and suitable drive mechanism is provided therefor which extends to the motor assembly, which is indicated generally by the reference character 26. All of the above described structure is entirely conventional in nature, and forms no part of this invention.

This invention is intended for use in connection with high output motorcycles of the type which utilizes a drive sump system in which a double-acting oil pump is utilized, the two inlets of the pump being connected to an oil reservoir tank 28 mounted, as by any suitable fasteners 30, to the frame of the motorcycle below the seat structure 32' thereof, and the crankcase of the engine. The outlets of these pump units are respectively connected to an oil galley line for supplying oil under pressure to the moving parts of the engine and to the oil reservoir tank. The operation is such that one of the pumps of the dual unit scavenges oil from the motorcycle crankcase and returns it to the reservoir tank, the other pump of the unit picks up oil from the reservoir tank and supplies it to the moving parts of the engine.

Referring now more particularly to Figure 7, wherein the improved system is diagrammatically shown, an oil radiator is indicated generally by the reference character 32, and reference numeral 34 indicates the double acting pump. It will be seen that a first conduit 36 extends between the top of the reservoir or reservoir tank 28 and the radiator 32, and that a second conduit 38 extends from the bottom of the reservoir to the inlet of the pressure or supply pump. The outlet of this supply pump is indicated in Figure 7 by the reference character 40 and communicates with an oil galley in the engine for supplying oil to the bearings and moving parts thereof. A further conduit 42 connects the sump of the crankcase with the inlet of the scavenging pump, and the outlet of this pump extends through conduit 44 to a point of connection at the bottom of the radiator 32. For a purpose which will be presently apparent, a portion 46 of the conduit 44 projects above the radiator 32.

A pressure relief line 48 connects the upper portion of the reservoir 28 with the crankcase of the engine, and a rotary valve member 50 is interposed in this line for a purpose which will be presently apparent. The relief line 48 and the rotary valve 50 interposed therein are conventional and are supplied in the normal dry sump system without the use of the radiator. The rotary valve 50 is driven by a component of the engine, and is so timed in operation that it establishes communication between the crankcase and the reservoir tank 28 at such time as greater than atmospheric pressure exists in the crankcase of the engine, to obviate any formation of a vacuum within the reservoir tank which might tend to starve the oil supply pump of the double acting unit and thus cause failure of the engine.

As will be seen most clearly in Figures 2 and 3, the radiator 32 comprises upper and lower headers or chambers 52 and 54 which are interconnected by a plurality of tubes 56 suitably secured thereto and opposite side frame members 58 and 60 also interconnect these header members to relieve supporting strain from the tubes 56. The upper and lower header members are provided with threaded nipples 62 and 64 for connection to the conduits 36 and 44, respectively, their construction being of any conventional nature.

As previously stated, a portion 46 of the conduit 44 extends above the level of the radiator 32, and the purpose of this construction is to prevent oil from draining back through the conduit 44 into the crankcase of the engine 26 when the engine is not running.

The provision of the supplemental oil cooling system permits the power output of the motorcycle engine to be materially increased without overloading the oil supply system and causing the oil to operate at a higher temperature range than is safe. In fact, the compression ratio of the engine may be materially increased and the power output otherwise increased to their practical limits, and the engine may still be run at very high speeds for prolonged lengths of time without causing damage to the pistons and cylinders, a condition which normally occurs under these circumstances.

As will be seen most clearly in Figure 1, couplings 66 are provided for attaching the line 36 to the reservoir 28 and a further coupling 68 is connected in this line adjacent to the reservoir. A still further coupling 70 is interposed in the line 36 at the point of its connection with the top of the oil radiator 32. Likewise, the line 44 is provided with a coupling 72 adjacent the crankcase of the engine, as well as a coupling 74 adjacent the oil radiator. Further, the intermediate section 46 of this line is connected thereinto by means of the two couplings 76 and 78.

It will be understood that the various lines 38, 40, 42 and 48 are the same in the system which includes the oil radiator as the conventional system, the lines 36 and 44 being the only ones which need be changed. If it is desired to reconnect the system in the conventional manner, this can be easily done by merely breaking and removing the lines 36 and 44, respectively at the couplings 68, 70 and 74 and 76, or at the couplings 66 and 72 and interposing a short line directly connecting the two line sections 80 and 82.

A short length of such line may be carried in the saddle bag of the motorcycle should it be deemed desirable to make the changeover at any time.

Referring now more particularly to Figures 1 and 4–6, it will be noted that novel means are provided for connecting the oil radiator to the frame structure of the motorcycle. The radiator 32 is provided at one side thereof with upper and lower projecting ears 84 and 86 (see Figure 2) by means of which the radiator assembly is rigidly attached to the bracket 85. The support bracket 85 includes a main longitudinal section 88 which is bifurcated at its lower end to present the leg portions 90 and 92 having the slot 94 therebetween. The upper end of the bracket is bent laterally to provide the arm portion 96 in the manner shown. In assembling the unit, the bracket 85 is first rigidly affixed to the vehicle frame, and for this purpose, it will be noted that the bifurcated end of the bracket is disposed such that the slot 94 straddles a bolt which is conventionally provided for fastening the right foot board member 98 to the frame, the bolt being first loosened for permitting the insertion of the bifurcated end of the bracket and then tightened to hold the bracket rigid therewith. The bracket is positioned such that the arm portion 96 thereof engages beneath the upper horizontal portion of the crash bar 16 and a U-bolt member 100 straddles the arm portion 96 and the crash bar 16 to cooperate with a clamping block 102 for rigidly securing the arm portion 96 to the crash bar. Next, the radiator is placed such that its ears 84 and 86 are engaged against the main portion 88 of the bracket and clamp straps 104 and 106 are placed in the manner shown in Figure 4 and clamped together as by the fasteners 108 to rigidly affix the radiator ears 84 and 86 to the bracket portion 88. Thus, the radiator 32 is rapidly and easily placed in proper position on the motorcycle frame.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a motorcycle including a frame, an engine mounted on said frame, a seat, a crash bar projecting laterally from the frame, a supplemental oil system for said engine comprising: a radiator mounted on said crash bar forwardly of the position normally occupied by the operator's leg, said radiator including upper and lower chambers interconnected by a plurality of tubes, a reservoir mounted on said frame beneath the seat, a first conduit connecting the upper chamber of said radiator with said reservoir, said engine including a scavenging pump and a pressure supply pump, a second conduit leading from said reservoir to the inlet of said supply pump, the outlet of said supply pump being connected to a gallery for supplying oil to the moving parts of the engine, and a third conduit connecting the outlet of said scavenging pump with the lower chamber of said radiator.

2. In combination with a motorcycle including a frame, an engine mounted on said frame, a seat, a crash bar projecting laterally from the frame, a supplemental oil system for said engine comprising: a radiator having ears, radiator support means including a bracket connected to said ears and provided with portions mounted on said crash bar for supporting said radiator forwardly of the position normally occupied by the operator's leg, said radiator including upper and lower chambers interconnected by a plurality of tubes, a reservoir mounted on said frame beneath the seat, a first conduit connecting the upper chamber of said radiator with said reservoir, said engine including a scavenging pump and a pressure supply pump, a second conduit leading from said reservoir to the inlet of said supply pump, the outlet of said supply pump being connected to a gallery for supplying oil to the moving parts of the engine, a third conduit connecting the outlet of said scavenging pump with the lower chamber of said radiator, and a pressure relief line connected to the top of said reservoir and to the crankcase of said engine.

3. In combination with a motorcycle including a frame, an engine mountel on said frame, a seat, a crash bar projecting laterally from the frame, a supplemental oil system for said engine comprising: a radiator having ears, radiator support means including a bracket connected to said ears and provided with portions mounted on said crash bar for supporting said radiator forwardly of the position normally occupied by the operator's leg, said radiator including upper and lower chambers interconnected by a plurality of tubes, a reservoir mounted on said frame beneath the seat, a first conduit connecting the upper chamber of said radiator with said reservoir, said engine including a scavenging pump and a pressure supply pump, a second conduit leading from said reservoir to the inlet of said supply pump, the outlet of said supply pump being connected to a gallery for supplying oil to the moving parts of the engine, a third conduit connecting the outlet of said scavenging pump with the lower chamber of said radiator, a pressure relief line connected to the top of said reservoir and to the crankcase of said engine, and a rotary valve disposed in said relief line for preventing the formation of a vacuum within said reservoir.

4. In combination with a motorcycle including a frame, an engine mounted on said frame, a seat, a crash bar projecting laterally from the frame, a supplemental oil system for said engine comprising: a radiator having ears, radiator support means including a bracket connected to said ears and provided with portions mounted on said crash bar for supporting said radiator forwardly of the position normally occupied by the operator's leg, said radiator including upper and lower chambers interconnected by a plurality of tubes, a reservoir mounted on said frame beneath the seat, a first conduit connecting the upper chamber of said radiator with said reservoir, said engine including a scavenging pump and a pressure supply pump, a second conduit leading from said reservoir to the inlet of said supply pump, the outlet of said supply pump being connected to a gallery for supplying oil to the moving parts of the engine, a third conduit connecting the outlet of said scavenging pump with the lower chamber of said radiator, said system being closed, and a pressure relief line extending between the reservoir and the crankcase of the engine to prevent the formation of a vacuum within said reservoir.

5. In combination with a motorcycle including a frame, an engine mounted on said frame, a seat, a crash bar projecting laterally from the frame, a supplemental oil system for said engine comprising: a radiator mounted on said crash bar forwardly of the position normally occupied by the operator's leg, said radiator including upper and lower chambers interconnected by a plurality of tubes, a reservoir mounted on said frame beneath the seat, a first conduit connecting the upper chamber of said radiator with said reservoir, said engine including a scavenging pump and a pressure supply pump, a second conduit leading from said reservoir to the inlet of said supply pump, the outlet of said supply pump being connected to a gallery for supplying oil to the moving parts of the engine, a third conduit connecting the outlet of said scavenging pump with the lower chamber of said radiator, said system being closed, a pressure relief line extending between the reservoir and the crankcase of the engine to prevent the formation of a vacuum within said reservoir, and a ball check valve in said relief line to permit air flow from the crankcase to the reservoir only.

6. In combination with a motorcycle including a frame, a foot board secured to said frame, and a crash bar rigid with the frame, an oil radiator including a body portion and vertically disposed upper and lower ears rigid therewith, a support bracket for attaching said radiator to the motorcycle, said support bracket comprising a flat body portion having a bifurcated lower end received and clamped between the motorcycle frame and the forward end of said foot board and a laterally bent arm at its upper end rigidly affixed to a portion of said crash bar, and means for rigidly securing said ears to the flat body portion of said bracket.

7. In combination with a motorcycle frame having a crash bar and a footboard bolt, an oil radiator including a body portion having ears extending therefrom, a support bracket for attaching said radiator to the motorcycle, said bracket comprising a flat body portion having means at the lower end engageable with said bolt to anchor the lower end of said support bracket, said support bracket including a laterally extending arm at its opposite end secured to a portion of said crash bar, and means for securing said ears to the body portion of said bracket.

References Cited in the file of this patent

UNITED STATES PATENTS

| | | |
|---|---|---|
| 1,941,801 | Harley | Jan. 2, 1934 |
| 2,188,801 | Worth | Jan. 30, 1940 |
| 2,481,755 | Jones | Sept. 13, 1949 |

FOREIGN PATENTS

| | | |
|---|---|---|
| 412,839 | Italy | Feb. 16, 1946 |